US012499803B2

United States Patent

(12) United States Patent
Choi et al.

(10) Patent No.: US 12,499,803 B2
(45) Date of Patent: Dec. 16, 2025

(54) DISPLAY APPARATUS AND METHOD OF OPERATING THE SAME

(71) Applicant: Samsung Display Co., Ltd., Yongin-Si (KR)

(72) Inventors: Sungsoo Choi, Yongin-si (KR); Jaehoon Lee, Yongin-si (KR); Junpyo Lee, Yongin-si (KR); Wonjin Seo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/948,473

(22) Filed: Nov. 15, 2024

(65) Prior Publication Data

US 2025/0157376 A1 May 15, 2025

(30) Foreign Application Priority Data

Nov. 15, 2023 (KR) ........................ 10-2023-0157858

(51) Int. Cl.
*G09G 3/20* (2006.01)

(52) U.S. Cl.
CPC ....... *G09G 3/20* (2013.01); *G09G 2300/0819* (2013.01); *G09G 2300/0842* (2013.01); *G09G 2300/0861* (2013.01); *G09G 2320/0233* (2013.01); *G09G 2320/0257* (2013.01); *G09G 2330/021* (2013.01)

(58) Field of Classification Search
CPC ........................... G09G 3/3283; G09G 3/3291
See application file for complete search history.

(56) References Cited

U.S. PATENT DOCUMENTS

| | | | | |
|---|---|---|---|---|
| 9,997,096 B2 | 6/2018 | Shin | | |
| 11,373,573 B2 | 6/2022 | Park | | |
| 2014/0168194 A1* | 6/2014 | Kong | .................. | G09G 3/3283 345/212 |
| 2017/0337875 A1* | 11/2017 | Jeon | ..................... | G09G 3/3291 |

FOREIGN PATENT DOCUMENTS

| | | |
|---|---|---|
| KR | 10-2248841 B1 | 5/2021 |
| KR | 10-2021-0122607 A | 10/2021 |

* cited by examiner

*Primary Examiner* — Kevin M Nguyen
(74) *Attorney, Agent, or Firm* — Innovation Counsel LLP

(57) ABSTRACT

A display apparatus is disclosed that includes a display panel including a pixel, a gate driver applying a gate signal, a data driver applying a data voltage, an emission driver applying an emission signal and a power voltage generator receiving a sensed power voltage and outputting a compensated power voltage. The pixel includes a driving transistor including a first control electrode receiving the data voltage, a second control electrode connected to a hold capacitor, a first electrode receiving a first power voltage and a second electrode connected to a first electrode of a light emitting element, the hold capacitor including a first electrode receiving the first power voltage and a second electrode connected to the second control electrode of the driving transistor and the light emitting element including a first electrode receiving the first power voltage and a second electrode receiving a second power voltage.

21 Claims, 9 Drawing Sheets

DISPLAY APPARATUS AND METHOD OF OPERATING THE SAME

PRIORITY STATEMENT

This application claims priority under 35 U.S.C. § 119 to Korean Patent Application No. 10-2023-0157858, filed on Nov. 15, 2023 in the Korean Intellectual Property Office KIPO, the contents of which are herein incorporated by reference in their entireties.

BACKGROUND

1. Field

Embodiments of the present inventive concept relate to a display apparatus and a method of operating the display apparatus.

2. Description of the Related Art

Generally, a display apparatus includes a display panel and a display panel driver. The display panel includes a plurality of gate lines, a plurality of data lines, a plurality of emission lines, a plurality of power voltage lines and a plurality of pixels. The display panel driver includes a power voltage generator providing a power voltage to the power voltage lines, a gate driver providing a gate signal to the gate lines, a data driver providing a data voltage to the data lines, an emission driver providing an emission signal to the emission lines and a driving controller controlling the gate driver, the data driver and the emission driver.

SUMMARY

Embodiments of the present inventive concept may provide a display apparatus reducing the visibility of afterimages, bright lines, and dark lines of a display panel by a power voltage generator generating a compensated power voltage considering a coupling.

Embodiments of the present inventive concept also provide a method of driving the display apparatus.

In an embodiment of a display apparatus according to the present inventive concept, the display apparatus includes a display panel including a pixel, a gate driver configured to apply a gate signal to the pixel, a data driver configured to apply a data voltage to the pixel, an emission driver configured to apply an emission signal to the pixel and a power voltage generator configured to receive a sensed power voltage from the display panel and configured to output a compensated power voltage to the display panel. The pixel includes a driving transistor including a first control electrode receiving the data voltage, a second control electrode connected to a hold capacitor, a first electrode receiving a first power voltage and a second electrode connected to a first electrode of a light emitting element, the hold capacitor including a first electrode receiving the first power voltage and a second electrode connected to the second control electrode of the driving transistor and the light emitting element including a first electrode receiving the first power voltage and a second electrode receiving a second power voltage.

In an embodiment, the power voltage generator may include a power voltage generator configured to generate an initial power voltage, a voltage calculator configured to receiving the initial power voltage and the sensed power voltage and configured to output a calculated power voltage obtained by inversely amplifying a difference between the initial power voltage and the sensed power voltage and a power voltage outputter configured to receive the initial power voltage and the calculated power voltage and configured to output the compensated power voltage.

In an embodiment, the voltage calculator may include a first capacitor including a first electrode receiving the sensed power voltage and a second electrode connected to a first node, a first resistor including a first terminal connected to the first node and a second terminal connected to a third node, a second resistor including a first terminal connected to the third node and a second terminal connected to a fourth node and an amplifier including a first input terminal connected to the third node, a second input terminal connected to a second node and receiving the initial power voltage and an output terminal connected to the fourth node. A voltage of the fourth node is the calculated power voltage.

In an embodiment, the voltage calculator may further include a second capacitor connected to the second node.

In an embodiment, the fourth node may not be connected to a capacitor.

In an embodiment, the pixel may further include a reset transistor including a control electrode receiving a reset gate signal, a first electrode receiving a compensated reference voltage and a second electrode connected to the first control electrode of the driving transistor. The compensated power voltage may be the compensated reference voltage.

In an embodiment, the first power voltage may be a compensated first power voltage. The compensated power voltage may be the compensated first power voltage.

In an embodiment, the emission signal may include a first emission signal and a second emission signal. The pixel may further include a first emission control transistor including a control electrode receiving the first emission signal, a first electrode receiving the compensated first power voltage and a second electrode connected to the first electrode of the driving transistor.

In an embodiment, the sensed power voltage may be a sensed reference voltage. The compensated power voltage may be a compensated reference voltage. The first electrode of the hold capacitor may receive the compensated reference voltage. The second electrode of the hold capacitor may be connected to the second control electrode of the driving transistor.

In an embodiment, the sensed power voltage may be a sensed first power voltage. The compensated power voltage may be a compensated first power voltage. The first power voltage may be the compensated first power voltage. The first electrode of the hold capacitor may receive the compensated first power voltage. The second electrode of the hold capacitor may be connected to the second control electrode of the driving transistor.

In an embodiment, the pixel may further include a storage capacitor including a first electrode connected to the first control electrode of the driving transistor and a second electrode connected to the second electrode of the driving transistor.

In an embodiment, the pixel may further include an initialization transistor including a control electrode receiving an initialization gate signal, a first electrode receiving an initialization voltage and a second electrode connected to the second electrode of the driving transistor.

In an embodiment, the emission signal may include a first emission signal and a second emission signal. The pixel may further include a second emission control transistor including a control electrode receiving the second emission signal, a first electrode connected to the second electrode of the driving transistor and a second electrode connected to the first electrode of the light emitting element.

In an embodiment of a method of operating a display apparatus according to the present inventive concept, the method includes generating an initial power voltage, receiving a sensed power voltage, generating a calculated power voltage obtained by inversely amplifying a difference between the initial power voltage and the sensed power voltage and outputting a compensated power voltage based on the initial power voltage and the calculated power voltage to a second control electrode of a driving transistor of a pixel.

In an embodiment, the pixel may include the driving transistor including a first control electrode receiving a data voltage, a second control electrode connected to a hold capacitor, a first electrode receiving a first power voltage and a second electrode connected to a first electrode of a light emitting element, a write transistor configured to apply the data voltage to the driving transistor, the hold capacitor including a first electrode receiving the compensated power voltage and a second electrode connected to the second control electrode of the driving transistor and the light emitting element including a first electrode receiving the first power voltage and a second electrode receiving a second power voltage.

In an embodiment, the sensed power voltage may be a sensed reference voltage. The compensated power voltage may be a compensated reference voltage. The first electrode of the hold capacitor may receive the compensated reference voltage. The second electrode of the hold capacitor may be connected to the second control electrode of the driving transistor.

In an embodiment, the sensed power voltage may be a sensed first power voltage. The compensated power voltage may be a compensated first power voltage. The first power voltage may be the compensated first power voltage. The first electrode of the hold capacitor may receive the compensated first power voltage. The second electrode of the hold capacitor may be connected to the second control electrode of the driving transistor.

In an embodiment, the pixel may further include a reset transistor including a control electrode receiving a reset gate signal, a first electrode receiving a compensated reference voltage and a second electrode connected to the first control electrode of the driving transistor.

In an embodiment, the pixel may further include an initialization transistor including a control electrode receiving an initialization gate signal, a first electrode receiving an initialization voltage and a second electrode connected to the second electrode of the driving transistor.

In an embodiment, the pixel may further include a storage capacitor including a first electrode connected to the first control electrode of the driving transistor and a second electrode connected to the second electrode of the driving transistor.

According to the display apparatus and the method of operating the display apparatus, the display apparatus may include a power voltage generator. The power voltage generator may receive the sensed power voltage through the sensing voltage line. The power voltage generator may calculate the calculated power voltage by calculating the sensed power voltage and the initial power voltage. The power voltage generator may output the compensated power voltage to a display panel of the display apparatus based on the calculated power voltage and the initial power voltage. Accordingly, the compensated power voltage may be maintained constantly by reflecting a change of the power voltage by the coupling of the data voltage. Accordingly, afterimages, bright lines, and dark lines may be reduced on the display panel. Additionally, a stability and a reliability of pixel of the display panel may be improved.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
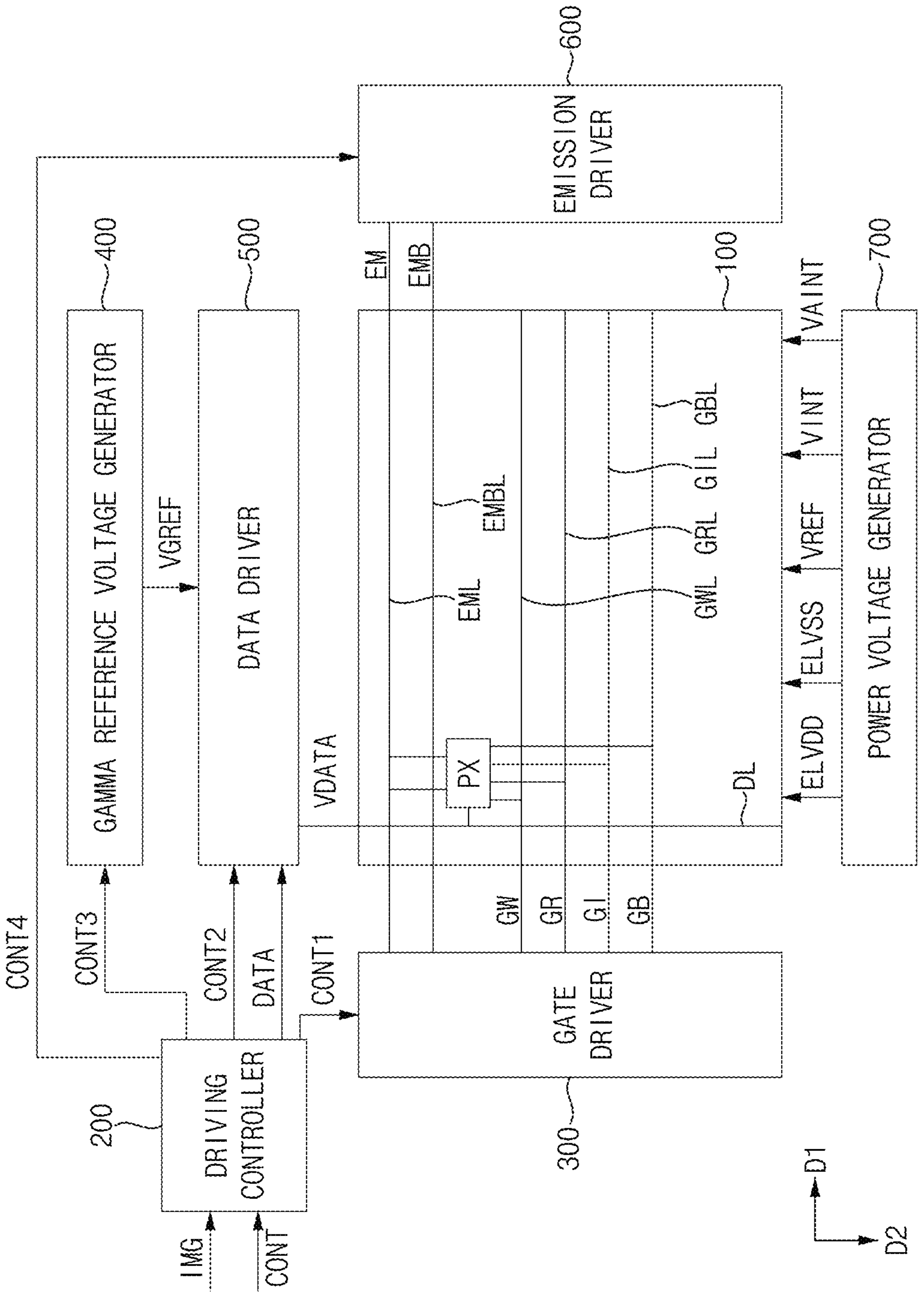
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. In an embodiment, the display panel driver includes a driving controller 200, a gate driver 300, a gamma reference voltage generator 400, a data driver 500, an emission driver 600 and power voltage generator 700.

The display panel 100 has a display region on which an image is displayed and a peripheral region adjacent to the display region.

The display panel 100 includes gate lines GWL, GRL, GIL and GBL, a data line DL and emission lines EML and EMBL and pixel PX connected to the gate lines GWL, GRL, GIL and GBL, a data line DL and emission lines EML and EMBL. The gate lines GWL, GRL, GIL and GBL may extend in a first direction D1. The data line DL may extend in a second direction D2 crossing the first direction D1. The emission lines EML and EMBL may extend in a first direction D1.

The driving controller 200 may receive input image data IMG and an input control signal CONT from an external apparatus. For example, the input image data IMG may include red image data, green image data and blue image data. For example, the input image data IMG may include white image data. For example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the fourth control signal CONT4 for controlling an operation of the emission driver 600 based on the input control signal CONT, and outputs the fourth control signal CONT4 to the emission driver 600.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals GW, GR, GI and GB driving the gate lines GWL, GRL, GIL and GBL in response to the first control signal CONT1 received from the driving controller 200. The gate driver 300 may output the gate signals GW, GR, GI and GB to the gate lines GWL, GRL, GIL and GBL.

In an embodiment of the present inventive concept, the gate driver 300 may be integrated on the peripheral region of the display panel 100. In an embodiment of the present inventive concept, the gate driver 300 may be mounted on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to each of the data signal DATA.

The gamma reference voltage generator 400 may be disposed in the driving controller 200 or in the data driver 500.

The data driver 500 receives the second control signal CONT2 and the data signal DATA from the driving controller 200 and receives the gamma reference voltages VGREF from the gamma reference voltage generator 400. The data driver 500 converts the data signal DATA into data voltages VDATA having an analog type using the gamma reference voltages VGREF. The data driver 500 outputs the data voltages VDATA to the data line DL.

In an embodiment of the present inventive concept, the data driver 500 may be integrated on the peripheral region of the display panel 100. In an embodiment of the present inventive concept, the data driver 500 may be mounted on the peripheral region of the display panel 100.

The emission driver 600 generates emission signals EM and EMB driving the emission lines EML and EMBL in response to the fourth control signal CONT4 received from the driving controller 200. The emission driver 600 may output the emission signals EM and EMB to the emission lines EML and EMBL.

In an embodiment of the present inventive concept, the emission driver 600 may be integrated on the peripheral region of the display panel 100. In an embodiment of the present inventive concept, the emission driver 600 may be mounted on the peripheral region of the display panel 100.

Although the gate driver 300 is disposed on a first side of the display panel 100, and the emission driver 600 is disposed on a second side of the display panel 100 in FIG. 1 for convenience of explanation, the present inventive concept is not limited thereto. The gate driver 300 and the emission driver 600 may be disposed on the first side of the display panel 100. For example, the gate driver 300 and the emission driver 600 may be disposed on the peripheral region of the display panel 100 on the same side of the display region of the display panel 100. For example, the gate driver 300 and the emission driver 600 may be formed integrally with each other.

The power voltage generator 700 may output a power voltage to the display panel 100. For example, the power voltage may include a compensated first power voltage ELVDD, a second power voltage ELVSS, a compensated reference voltage VREF, an initialization voltage VINT and a light emitting element initialization voltage VAINT. For example, the power voltage may be DC voltage. In an embodiment, the power voltage generator 700 may include a power voltage generating circuit, voltage calculator and voltage outputter.

Figure 2:
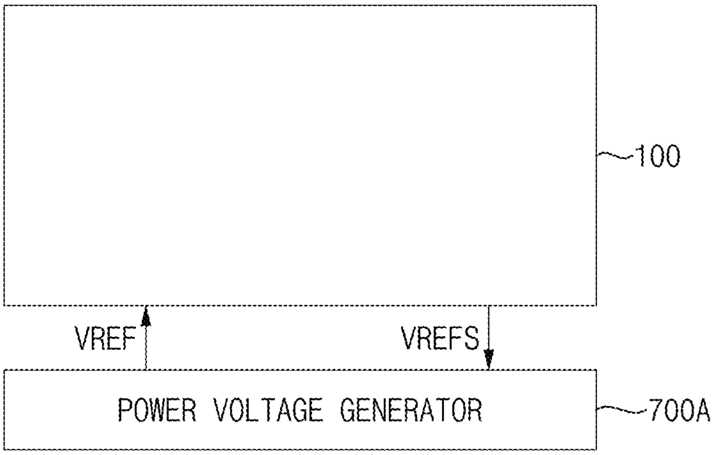
FIG. 2 is a block diagram illustrating an example of a display panel and a power voltage generator of FIG. 1.

FIG. 2 is a block diagram illustrating an example of a display panel 100 and a power voltage generator 700 of FIG. 1.

Referring to FIG. 2, in the present embodiment, the power voltage generator 700A may receive a sensed reference voltage VREFS from the display panel 100. The power voltage generator 700A may output the compensated reference voltage VREF to the display panel 100. For example, the display panel 100 may be connected to the power voltage generator 700A through a sensed reference voltage line and a reference voltage line. The display panel 100 may output the sensed reference voltage VREFS to the sensed reference voltage line. The power voltage generator 700A may output the compensated reference voltage VREF to the reference voltage line. In an embodiment, the reference voltage line may have a mesh structure. However, the present inventive concept is not limited to a structure of the reference voltage line.

Figure 3:
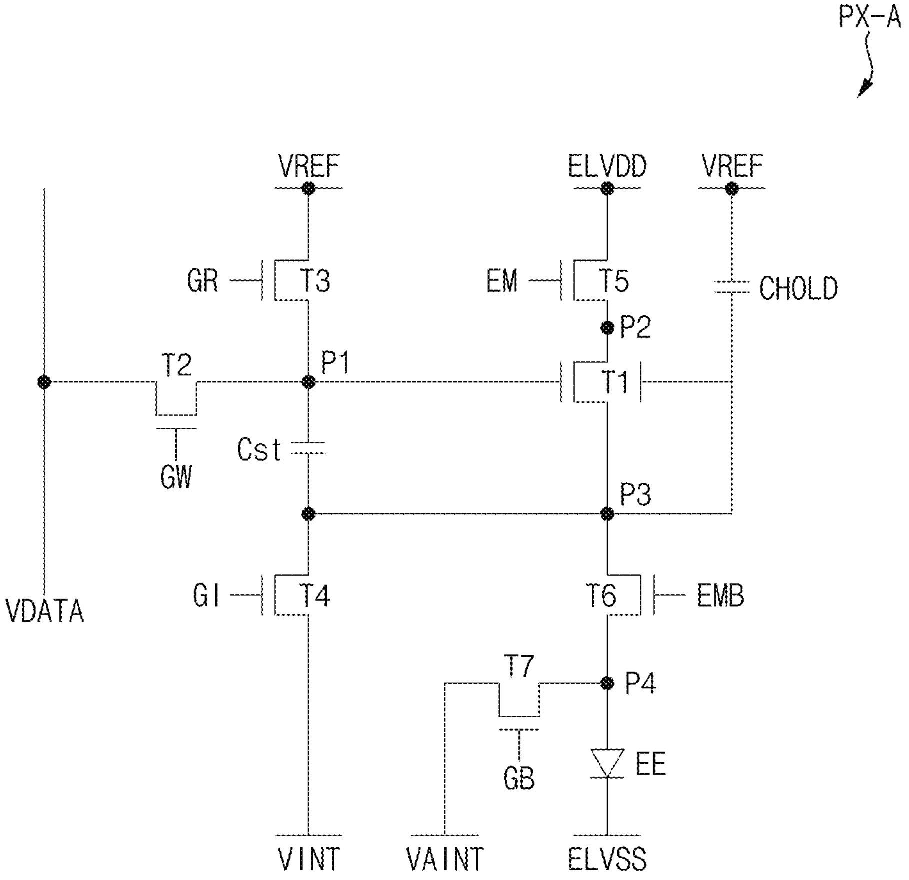
FIG. 3 is a circuit diagram illustrating an example of a pixel of FIG. 1.

FIG. 3 is a circuit diagram illustrating an example of a pixel of FIG. 1.

Referring to FIG. 3, in the present embodiment, a pixel PX-A may include a first transistor T1, a second transistor T2, a third transistor T3, a fourth transistor T4, a fifth transistor T5, a sixth transistor T6, a seventh transistor T7, a storage capacitor Cst, a hold capacitor CHOLD and a light emitting element EE.

The first transistor T1 may include a first control electrode connected to a first node P1, a second control electrode connected to a third node P3, a first electrode connected to a second node P2 and a second electrode connected to the third node P3. The first transistor T1 may output a driving current for driving the light emitting element EE in response to a voltage of the first node P1. For example, the first transistor T1 may be called as a driving transistor. In the present embodiment, the first transistor T1 may have double-gate structure.

The second transistor T2 may include a control electrode receiving a write gate signal GW, a first electrode receiving the data voltage VDATA and a second electrode connected to the first node P1. The second transistor T2 may apply the data voltage VDATA to the first node P1 in response to the write gate signal GW. For example, the second transistor T2 may be called as a write transistor.

The third transistor T3 may include a control electrode receiving a reset gate signal GR, a first electrode receiving the compensated reference voltage VREF and a second electrode connected to the first node P1. The third transistor T3 may apply the compensated reference voltage VREF to the first node P1 in response to the reset gate signal GR. For example, the third transistor T3 may be called as a reset transistor.

The fourth transistor T4 may include a control electrode receiving an initialization gate signal GI, a first electrode receiving the initialization voltage VINT and a second electrode connected to a third node P3. The fourth transistor T4 may apply the initialization voltage VINT to the third node P3 in response to the initialization gate signal GI. For example, the fourth transistor T4 may be called as an initialization transistor.

The fifth transistor T5 may include a control electrode receiving a first emission signal EM, a first electrode receiving the compensated first power voltage ELVDD and a second electrode connected to the second node P2. The fifth transistor T5 may apply the compensated first power voltage to the second node P2 in response to the first emission signal EM. For example, the fifth transistor T5 may be called as a first emission control transistor.

The sixth transistor T6 may include a control electrode receiving a second emission signal EMB, a first electrode connected to the third node P3 and a second electrode connected to a fourth node P4. The sixth transistor T6 may apply a voltage of the third node P3 to the fourth node P4 in response to the second emission signal EMB. The sixth transistor T6 may apply the driving current to the light emitting element EE in response to the second emission signal EMB. For example, the sixth transistor T6 may be called as a second emission control transistor.

The seventh transistor T7 may include a control electrode receiving a light emitting element initialization gate signal GB, a first electrode receiving a light emitting element initialization voltage VAINT and a second electrode connected to the fourth node P4. The seventh transistor T7 may apply the light emitting element initialization voltage VAINT to the fourth node P4 in response to the light emitting element initialization gate signal GB.

The storage capacitor Cst may include a first electrode connected to the first node P1 and a second electrode connected to the third node P3. The storage capacitor Cst may storage a difference between a voltage of the first node P1 and a voltage of the third node P3.

The hold capacitor CHOLD may include a first electrode receiving the compensated reference voltage VREF and a second electrode connected to the third node P3. The hold capacitor CHOLD may improve a reliability and a stability of the pixel PX-A.

The light emitting element EE may include a first electrode (e.g., an anode) connected to the fourth node P4 and a second electrode (e.g., a cathode) receiving the second power voltage ELVSS. The light emitting element EE may emit the light based on the driving current.

Figure 4:
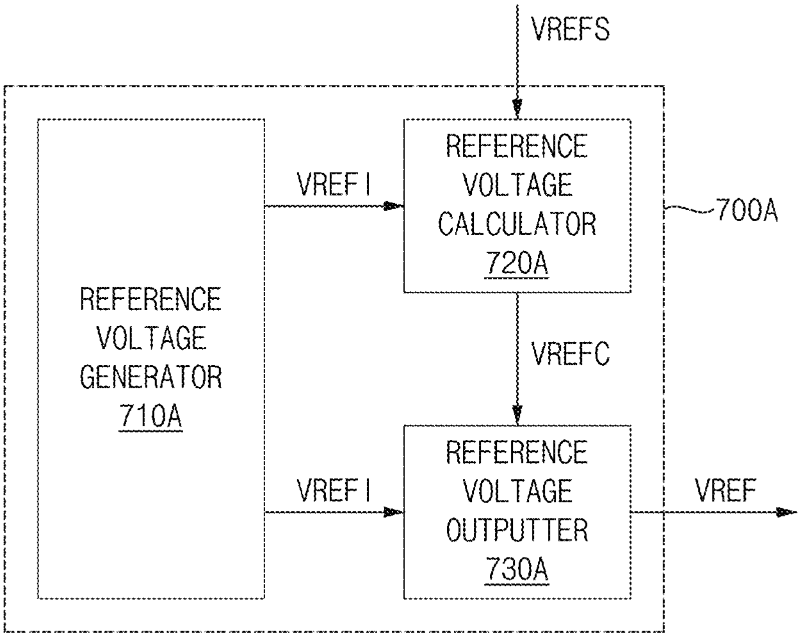
FIG. 4 is a block diagram illustrating an example of a power voltage generator of FIG. 1.

FIG. 4 is a block diagram illustrating an example of a power voltage generator 700A of FIG. 2.

Referring to FIGS. 1 to 4, in the present embodiment, the power voltage generator 700A may include a reference voltage generator 710A, a reference voltage calculator 720A and a reference voltage outputter 730A.

The reference voltage generator 710A may generate an initial reference voltage VREFI. The reference voltage generator 710A may apply the initial reference voltage VREFI to the reference voltage calculator 720A and the reference voltage outputter 730A.

The reference voltage calculator 720A may receive the initial reference voltage VREFI. The reference voltage calculator 720A may receive the sensed reference voltage VREFS. The reference voltage calculator 720A may calculate a calculated reference voltage VREFC based on the initial reference voltage VREFI and the sensed reference voltage VREFS. The reference voltage calculator 720A may output the calculated reference voltage VREFC to the reference voltage outputter 730A.

The reference voltage outputter 730A may receive the initial reference voltage VREFI. The reference voltage outputter 730A may receive the calculated reference voltage VREFC. The reference voltage outputter 730A may generate the compensated reference voltage VREF based on the initial reference voltage VREFI and the calculated reference voltage VREFC. For example, the compensated reference voltage VREF may be a sum of the calculated reference voltage VREFC and the initial reference voltage VREFI. The reference voltage outputter 730A may output the compensated reference voltage VREF to the display panel 100.

Figure 5:
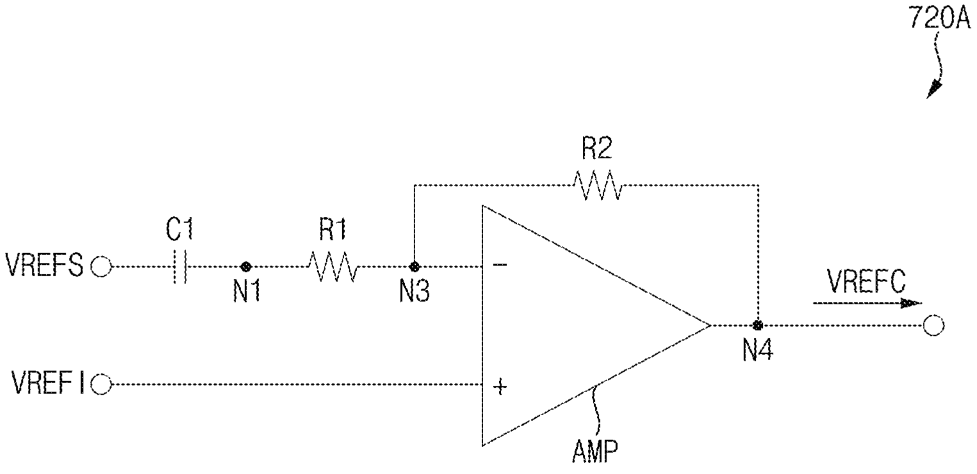
FIG. 5 is a circuit diagram illustrating an example of reference voltage calculator of FIG. 4.

FIG. 5 is a circuit diagram illustrating an example of reference voltage calculator 720A of FIG. 4.

Referring to FIGS. 1 to 5, in the present embodiment, the reference voltage calculator 720A may include a first capacitor C1, a first resistor R1, a second resistor R2 and an amplifier AMP.

The first capacitor C1 may include a first electrode receiving the sensed reference voltage VREFS and a second electrode connected to a first node N1. The first resistor R1 may include a first terminal connected to the first node N1 and a second terminal connected to a third node N3. The second resistor R2 may include a first terminal connected to the third node N3 and a second terminal connected to a fourth node N4. The amplifier AMP may include a first input terminal connected to the third node N3, a second input terminal receiving the initial reference voltage VREFI and an output terminal connected to the fourth node N4. The reference voltage calculator 720A may output a voltage of the fourth node N4 as the calculated reference voltage VREFC. For example, the reference voltage calculator 720A may include inverting amplifier.

In an embodiment, the fourth node N4 may be not connected to a capacitor. Accordingly, a reliability and a stability of the reference voltage calculator 720A may be further improved. Additionally, the accuracy of the calculated reference voltage VREFC may be further improved.

In a conventional display apparatus, a reference voltage may be coupled to the data voltage according to the design pattern of the display panel. The reference voltage may be changed by the coupling. The reference voltage is changed, so that a voltage of the second control electrode and a voltage of the source electrode of the driving transistor may be changed. Accordingly, the driving transistor may malfunction. Afterimages, bright lines and dark lines, etc. may be visible on the display panel because of the malfunction of the driving transistor.

In contrast, the power voltage generator 700A according to the present inventive concept may receive the sensed reference voltage VREFS through the sensed reference voltage line VREFSL. The power voltage generator 700A may calculate the calculated reference voltage VREFC based on the sensed reference voltage VREFS and the initial reference voltage VREFI. The power voltage generator 700A may output the compensated reference voltage VREF to the display panel 100 based on the calculated reference voltage VREFC and the initial reference voltage VREFI. Accordingly, the compensated reference voltage VREF may be maintained constant by reflecting a change of voltage by the coupling. Accordingly, afterimages, bright lines, and dark lines may be reduced. Additionally, the stability and reliability of the pixel PX-A may be improved.

Figure 6:
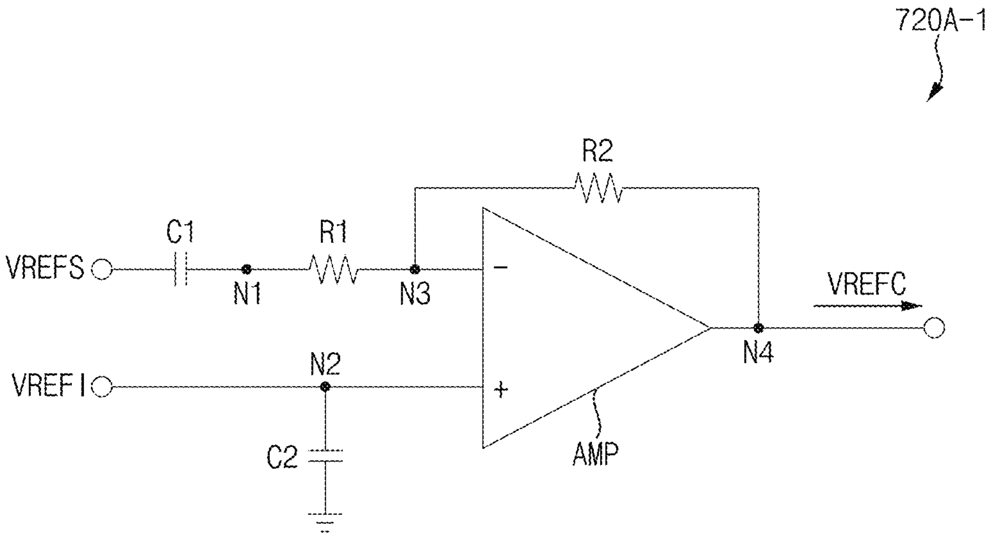
FIG. 6 is a circuit diagram illustrating an example of reference voltage calculator of FIG. 4.

FIG. 6 is a circuit diagram illustrating an example of reference voltage generator of FIG. 4.

A reference voltage calculator 720A-1 of FIG. 6 is substantially same as the reference voltage calculator 720A of FIG. 5 except that the reference voltage calculator 720A-1 further includes a second capacitor C2, so that the same reference numerals will be used to refer to the same and repetitive explanation concerning the above elements is omitted.

Referring to FIG. 6, the reference voltage calculator 720A-1 may further include the second capacitor C2 connected to the second node N2. Accordingly, a reliability and a stability of the reference voltage calculator 720A-1 may be further improved. Accordingly, an accuracy of the calculated reference voltage VREFC may be improved. Accordingly, an accuracy of the compensated reference voltage VREF may be improved.

Figure 7:
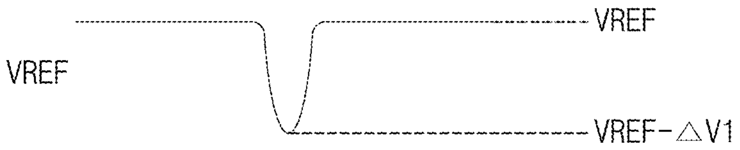
FIG. 7 is a graph illustrating a change of a reference voltage in a conventional display apparatus.

FIG. 7 is a graph illustrating a change of a reference voltage in a conventional display apparatus.

Referring to FIG. 7, in the conventional display apparatus, the reference voltage VREF may be changed by the coupling. For example, when the data voltage is changed from a data voltage corresponding to a white to a data voltage corresponding to a black, the reference voltage VREF of the conventional display apparatus may be a changed reference voltage VREF-ΔV1. Accordingly, afterimages, bright lines and dark lines are visible on a display panel of the conventional display apparatus.

Figure 8:
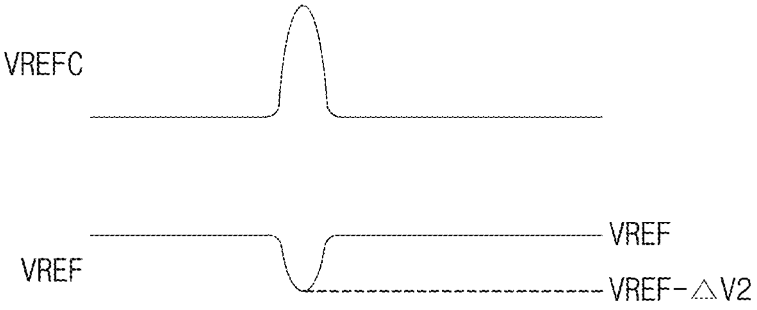
FIG. 8 is a graph illustrating a calculated reference voltage and a compensated reference voltage of FIG. 4.

FIG. 8 is a graph illustrating a calculated reference voltage VREFC and a compensated reference voltage VREF of FIG. 4.

Referring to FIG. 8, in the present embodiment, the calculated reference voltage VREFC may be a value reflecting a change of a voltage by the coupling. For example, the calculated reference voltage VREFC may be a value in which the sensed reference voltage VREFS is inversely amplified. The compensated reference voltage VREF may be a value considering the initial reference voltage VREFI and the calculated reference voltage VREFC. Accordingly, the compensated reference voltage VREF may be less affected by the coupling. For example, the compensated reference voltage VREF may have a changed compensated reference voltage VREF-ΔV2 by the coupling. The changed compensated reference voltage VREF-ΔV2 may be lower than the changed reference voltage VREF-ΔV1 of FIG. 7. Accordingly, the compensated reference voltage VREF may be maintained constantly. Accordingly, the afterimage, the bright line, and the dark line may be reduced. Additionally, a stability and a reliability of the pixel PX-A may be improved.

Figure 9:
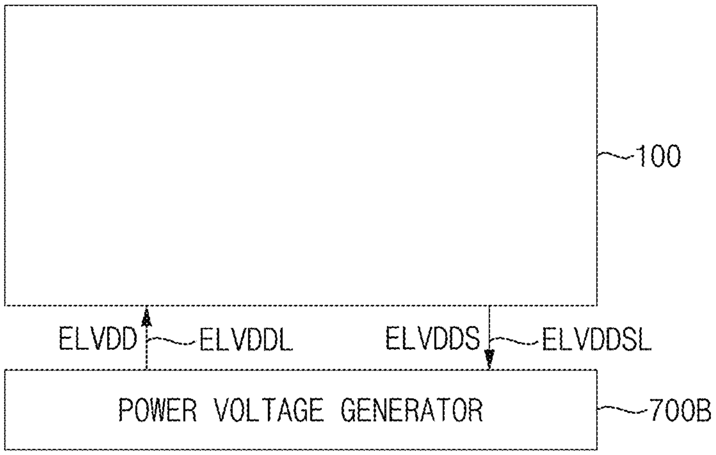
FIG. 9 is a block diagram illustrating an example of a display panel and a power voltage generator of FIG. 1.

FIG. 9 is a block diagram illustrating an example of a display panel and a power voltage generator of FIG. 1.

Referring to FIG. 9, the display panel 100 may include a first power voltage line ELVDDL and a sensed first power voltage line ELVDDSL. In the present embodiment, the power voltage generator 700B may receive a sensed first power voltage ELVDDS from the display panel 100. The power voltage generator 700B may output a compensated first power voltage ELVDD to the display panel 100. For example, the display panel 100 may be connected to the power voltage generator 700B through the sensed first power voltage line ELVDDSL and the first power voltage line ELVDDL. The display panel 100 may output the sensed first power voltage ELVDDS to the sensed first power voltage line ELVDDSL. The power voltage generator 700B may output the compensated first power voltage ELVDD to the first power voltage line ELVDDL. In an embodiment, the first power voltage line ELVDDL may have a mesh structure. However, the present inventive concept is not limited to a structure of the first power voltage line ELVDDL.

Figure 10:
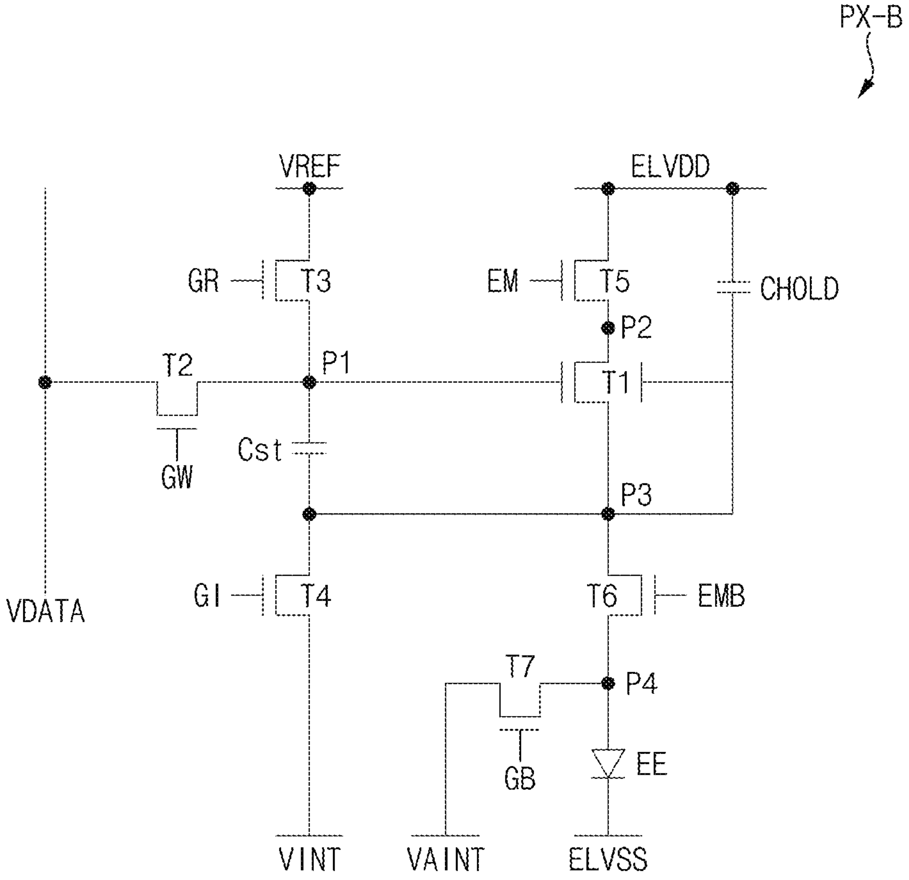
FIG. 10 is a circuit diagram illustrating an example of a pixel of FIG. 1.

FIG. 10 is a circuit diagram illustrating an example of a pixel PX of FIG. 1.

Referring to FIG. 10, a pixel PX-B of FIG. 10 is substantially same as the pixel PX-A of FIG. 3 except that the hold capacitor CHOLD receives not the compensated reference voltage VREF but the compensated first power voltage ELVDD, so that the same reference numerals will be used to refer to the same and repetitive explanation concerning the above elements is omitted.

Figure 11:
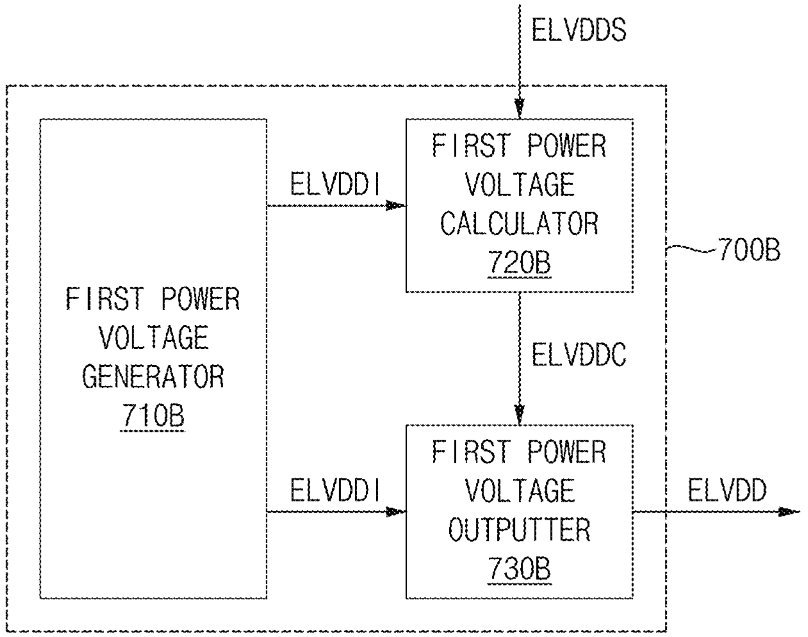
FIG. 11 is a block diagram illustrating an example of a power voltage generator of FIG. 1.

FIG. 11 is a block diagram illustrating an example of a power voltage generator of FIG. 1.

Referring to FIGS. 1 and 9 to 11, in the present embodiment, the power voltage generator 700B may include a first power voltage generator 710B, a first power voltage calculator 720B and a first power voltage outputter 730B.

The first power voltage generator 710B may generate an initial first power voltage ELVDDI. The first power voltage generator 710B may apply the initial first power voltage ELVDDI to the first power voltage calculator 720B and the first power voltage outputter 730B.

The first power voltage calculator 720B may receive the initial first power voltage ELVDDI. The first power voltage calculator 720B may receive the sensed first power voltage ELVDDS. The first power voltage calculator 720B may calculate the initial first power voltage ELVDDS and the sensed first power voltage ELVDDS. The first power voltage calculator 720B may output a calculated first power voltage ELVDDC to the first power voltage outputter 730B.

The first power voltage outputter 730B may receive the initial first power voltage ELVDDI. The first power voltage outputter 730B may receive the calculated first power voltage ELVDDC. The first power voltage outputter 730B may generate the compensated first power voltage ELVDD based on the initial first power voltage ELVDDI and the calculated first power voltage ELVDDC. For example, the compensated first power voltage ELVDD may be a sum of the calculated first power voltage ELVDDC and the initial first power voltage ELVDDI. The first power voltage outputter 730B may output the compensated first power voltage ELVDD to the display panel 100.

Figure 12:
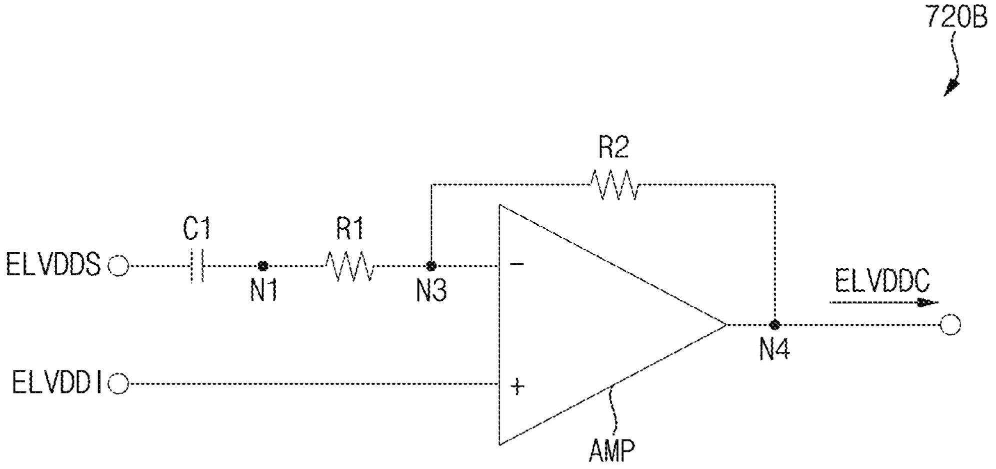
FIG. 12 is a circuit diagram illustrating an example of a first power voltage calculator of FIG. 11.

FIG. 12 is a circuit diagram illustrating an example of a first power voltage calculator of FIG. 11.

Referring to FIG. 12, the first power voltage calculator 720B of FIG. 12 is substantially same as the reference voltage calculator 720A of FIG. 5 except that the first power voltage calculator 720B receives not the initial reference voltage VREFI but the initial first power voltage ELVDDI and the first power voltage calculator 720B receives not the sensed reference voltage VREFS but the sensed first power voltage ELVDDS, so that the same reference numerals will be used to refer to the same and repetitive explanation concerning the above elements is omitted.

Referring to FIG. 11, in the present embodiment, the power voltage generator 700B may receive the sensed first power voltage ELVDDS through the sensed first power voltage line ELVDDSL. The power voltage generator 700B may calculate the calculated first power voltage ELVDDC based on the sensed first power voltage ELVDDS and the initial first power voltage ELVDDI. The power voltage generator 700B may output the compensated first power voltage ELVDD to the display panel 100 based on the calculated first power voltage ELVDDC and the initial first power voltage ELVDDI. Accordingly, the compensated first power voltage ELVDD may be maintained constant by reflecting a change of voltage by the coupling. Accordingly, afterimages, bright lines, and dark lines may be reduced. Additionally, the stability and reliability of the pixel PX-B may be improved.

Figure 13:
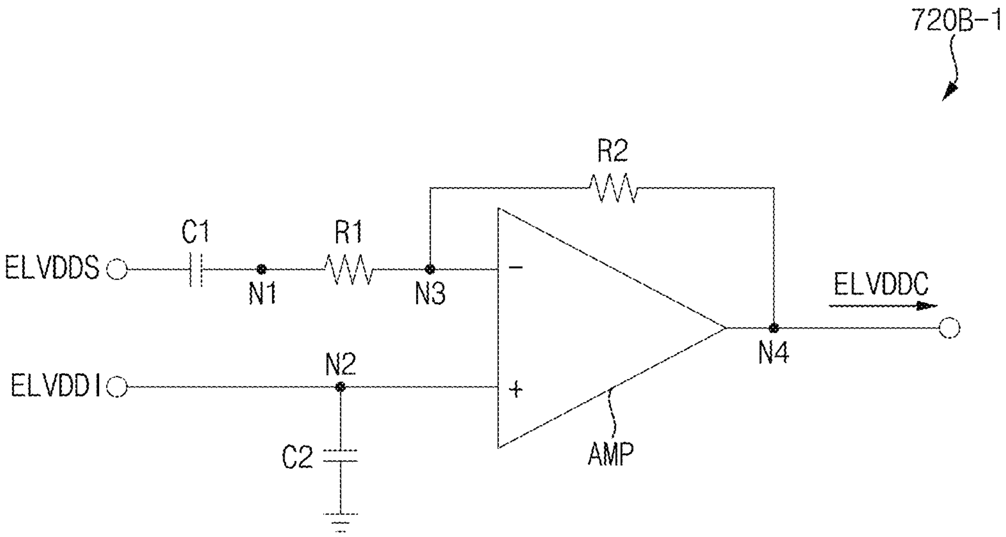
FIG. 13 is a circuit diagram illustrating an example of a first power voltage calculator of FIG. 11.

FIG. 13 is a circuit diagram illustrating an example of a first power voltage calculator of FIG. 11.

A first power voltage calculator 720B-1 of FIG. 13 is substantially same as the first power voltage calculator 720B of FIG. 12 except that the first power voltage calculator 720B-1 further includes a second capacitor C2, so that the same reference numerals will be used to refer to the same and repetitive explanation concerning the above elements is omitted.

Referring to FIG. 13, the first power voltage calculator 720B-1 may further include the second capacitor C2 connected to the second node N2. Accordingly, a reliability and a stability of the first power voltage calculator 720B-1 may be further improved. Accordingly, an accuracy of the calculated first power voltage ELVDDC may be improved. Accordingly, an accuracy of the compensated first power voltage ELVDD may be improved.

Figure 14:
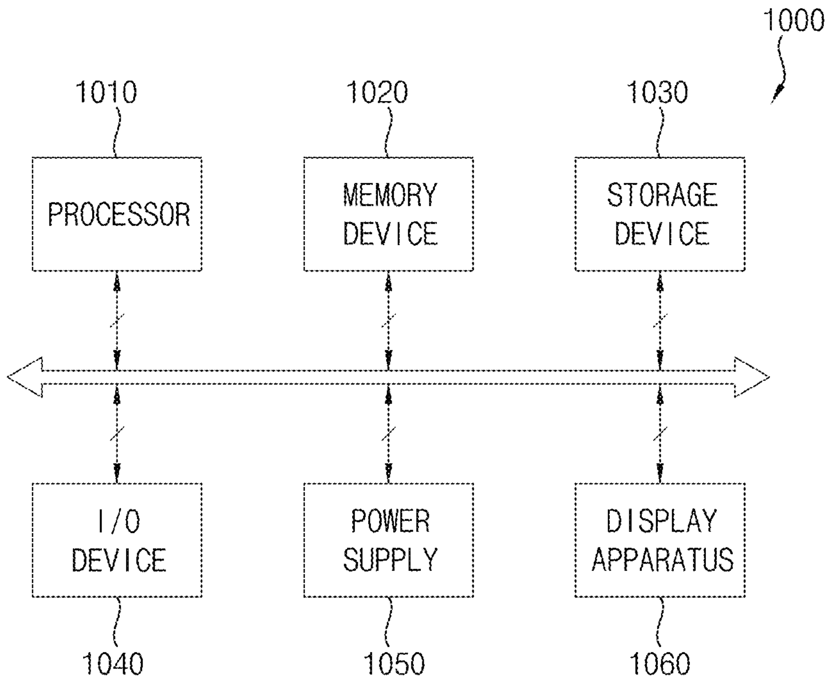
FIG. 14 is a block diagram illustrating an electronic apparatus according to an embodiment of the present inventive concept.
Figure 15:
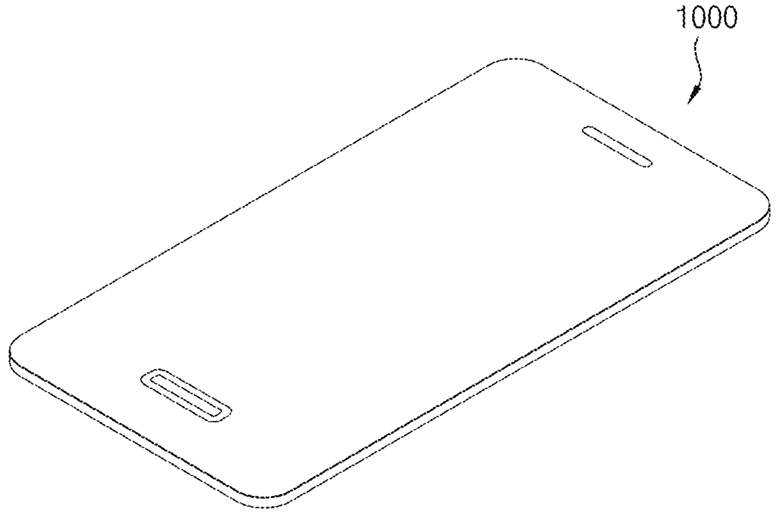
FIG. 15 is a diagram illustrating an example in which the electronic apparatus of FIG. 7 is implemented as a smart phone.

FIG. 14 is a block diagram illustrating an electronic apparatus according to an embodiment of the present inventive concept. FIG. 15 is a diagram illustrating an example in which the electronic apparatus of FIG. 14 is implemented as a smart phone.

Referring to FIGS. 14 and 15, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 15, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

The display apparatus according to the embodiments may be applied to a display device included in a computer, a notebook, a mobile phone, a smart phone, a smart pad, a PMP, a PDA, an MP3 player, or the like.

The foregoing is illustrative of the present inventive concept and is not to be construed as limiting thereof. Although embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display apparatus comprising:
a display panel including a pixel;
a gate driver configured to apply a gate signal to the pixel;
a data driver configured to apply a data voltage to the pixel;
an emission driver configured to apply an emission signal to the pixel; and
a power voltage generator configured to receive a sensed power voltage from the display panel and configured to output a compensated power voltage to the display panel,
wherein the pixel comprises:
a driving transistor including a first control electrode configured to receive the data voltage, a second control electrode connected to a hold capacitor, a first electrode configured to receive a first power voltage and a second electrode connected to a first electrode of a light emitting element;
the hold capacitor including a first electrode configured to receive the compensated power voltage and a second electrode connected to the second control electrode of the driving transistor; and
the light emitting element including the first electrode configured to receive the first power voltage and a second electrode configured to receive a second power voltage.

2. The display apparatus of claim 1, wherein the power voltage generator comprises:
a power voltage generating circuit configured to generate an initial power voltage;
a voltage calculator configured to receive the initial power voltage and the sensed power voltage and configured to output a calculated power voltage obtained by inversely amplifying a difference between the initial power voltage and the sensed power voltage; and
a power voltage outputter configured to receive the initial power voltage and the calculated power voltage and configured to output the compensated power voltage.

3. The display apparatus of claim 2, wherein the voltage calculator comprises:
a first capacitor including a first electrode configured to receive the sensed power voltage and a second electrode connected to a first node;
a first resistor including a first terminal connected to the first node and a second terminal connected to a third node;
a second resistor including a first terminal connected to the third node and a second terminal connected to a fourth node; and
an amplifier including a first input terminal connected to the third node, a second input terminal connected to a second node, the second input terminal configured to receive the initial power voltage, and an output terminal connected to the fourth node, and
wherein a voltage of the fourth node is the calculated power voltage.

4. The display apparatus of claim 3, wherein the voltage calculator further comprises a second capacitor connected to the second node.

5. The display apparatus of claim 3, wherein the fourth node is not connected to a capacitor.

6. The display apparatus of claim 3, wherein the pixel further comprises a reset transistor including a control electrode configured to receive a reset gate signal, a first electrode configured to receive a compensated reference voltage and a second electrode connected to the first control electrode of the driving transistor, and
wherein the compensated power voltage is the compensated reference voltage.

7. The display apparatus of claim 3, wherein the first power voltage is a compensated first power voltage, and
wherein the compensated power voltage is the compensated first power voltage.

8. The display apparatus of claim 7, wherein the emission signal includes a first emission signal and a second emission signal, and
wherein the pixel further comprises a first emission control transistor including a control electrode configured to receive the first emission signal, a first electrode configured to receive the compensated first power voltage and a second electrode connected to the first electrode of the driving transistor.

9. The display apparatus of claim 1, wherein the sensed power voltage is a sensed reference voltage,
wherein the compensated power voltage is a compensated reference voltage,
wherein the first electrode of the hold capacitor is configured to receive the compensated reference voltage, and
wherein the second electrode of the hold capacitor is connected to the second control electrode of the driving transistor.

10. The display apparatus of claim 1, wherein the sensed power voltage is a sensed first power voltage,
wherein the compensated power voltage is a compensated first power voltage,
wherein the first power voltage is the compensated first power voltage,
wherein the first electrode of the hold capacitor is configured to receive the compensated first power voltage, and
wherein the second electrode of the hold capacitor is connected to the second control electrode of the driving transistor.

11. The display apparatus of claim 1, wherein the pixel further comprises a storage capacitor including a first electrode connected to the first control electrode of the driving transistor and a second electrode connected to the second electrode of the driving transistor.

12. The display apparatus of claim 1, wherein the pixel further comprises an initialization transistor including a control electrode configured to receive an initialization gate signal, a first electrode configured to receive an initialization voltage and a second electrode connected to the second electrode of the driving transistor.

13. The display apparatus of claim 1, wherein the emission signal includes a first emission signal and a second emission signal, and
wherein the pixel further comprises a second emission control transistor including a control electrode configured to receive the second emission signal, a first electrode connected to the second electrode of the driving transistor and a second electrode connected to the first electrode of the light emitting element.

14. A method of operating a display apparatus, the method comprising:
generating an initial power voltage;
receiving a sensed power voltage;

generating a calculated power voltage obtained by inversely amplifying a difference between the initial power voltage and the sensed power voltage; and outputting a compensated power voltage to a second control electrode of a driving transistor of a pixel based on the initial power voltage and the calculated power voltage.

15. The method of claim 14, wherein the pixel comprises:

the driving transistor including a first control electrode configured to receive a data voltage, a second control electrode connected to a hold capacitor, a first electrode configured to receive a first power voltage and a second electrode connected to a first electrode of a light emitting element;

a write transistor configured to apply the data voltage to the driving transistor;

the hold capacitor including a first electrode configured to receive the compensated power voltage and a second electrode connected to the second control electrode of the driving transistor; and the light emitting element including a first electrode configured to receive the first power voltage and a second electrode configured to receive a second power voltage.

16. The method of claim 15, wherein the sensed power voltage is a sensed reference voltage, wherein the compensated power voltage is a compensated reference voltage, wherein the first electrode of the hold capacitor is configured to receive the compensated reference voltage, and wherein the second electrode of the hold capacitor is connected to the second control electrode of the driving transistor.

17. The method of claim 15, wherein the sensed power voltage is a sensed first power voltage, wherein the compensated power voltage is a compensated first power voltage, wherein the first power voltage is the compensated first power voltage, wherein the first electrode of the hold capacitor is configured to receive the compensated first power voltage, and wherein the second electrode of the hold capacitor is connected to the second control electrode of the driving transistor.

18. The method of claim 15, wherein the pixel further comprises a reset transistor including a control electrode configured to receive a reset gate signal, a first electrode configured to receive a compensated reference voltage and a second electrode connected to the first control electrode of the driving transistor.

19. The method of claim 15, wherein the pixel further comprises an initialization transistor including a control electrode configured to receive an initialization gate signal, a first electrode configured to receive an initialization voltage and a second electrode connected to the second electrode of the driving transistor.

20. The method of claim 15, wherein the pixel further comprises a storage capacitor including a first electrode connected to the first control electrode of the driving transistor and a second electrode connected to the second electrode of the driving transistor.

21. An electronic apparatus comprising:

a display panel including a pixel;

a gate driver configured to apply a gate signal to the pixel;

a data driver configured to apply a data voltage to the pixel;

an emission driver configured to apply an emission signal to the pixel;

a power voltage generator configured to receive a sensed power voltage from the display panel and configured to output a compensated power voltage to the display panel;

a driving controller configured to control the gate driver, the data driver, the emission driver and the power voltage generator based on an input control signal; and a processor configured to output the input control signal, wherein the pixel comprises:

a driving transistor including a first control electrode configured to receive the data voltage, a second control electrode connected to a hold capacitor, a first electrode configured to receive a first power voltage and a second electrode connected to a first electrode of a light emitting element;

the hold capacitor including a first electrode configured to receive the compensated power voltage and a second electrode connected to the second control electrode of the driving transistor; and the light emitting element including the first electrode configured to receive the first power voltage and a second electrode configured to receive a second power voltage.

* * * * *